United States Patent
Krishnan et al.

(10) Patent No.: US 6,799,815 B2
(45) Date of Patent: Oct. 5, 2004

(54) COLD ENVIRONMENT ENDLESS RUBBER TRACK AND VEHICLE CONTAINING SUCH TRACK

(75) Inventors: Ram Murthy Krishnan, Munroe Falls, OH (US); Lewis Timothy Lukich, Akron, OH (US); Michael Brendan Rodgers, Copley, OH (US); Ray Eugene Beery, Akron, OH (US); Glenn Charles Rabatin, St. Marys, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 13 days.

(21) Appl. No.: 10/201,737

(22) Filed: Jul. 22, 2002

(65) Prior Publication Data

US 2003/0080618 A1 May 1, 2003

Related U.S. Application Data

(60) Provisional application No. 60/323,030, filed on Sep. 12, 2001.

(51) Int. Cl.[7] ............................................. B62D 55/24
(52) U.S. Cl. ........................ 305/165; 305/178; 524/492; 525/98
(58) Field of Search .......................... 428/119; 305/165, 305/178; 524/492; 525/98

(56) References Cited

U.S. PATENT DOCUMENTS

| | | | |
|---|---|---|---|
| 2,887,343 A | 5/1959 | West | 305/10 |
| 3,781,067 A | 12/1973 | Dodson et al. | 305/35 |
| 3,900,231 A | 8/1975 | Ohm | 305/35 |
| 4,279,449 A | 7/1981 | Martin et al. | 305/35 |
| 4,861,842 A | 8/1989 | Cohen et al. | 525/329.3 |
| 5,227,425 A | 7/1993 | Rauline | 524/493 |
| 5,264,290 A | 11/1993 | Touchet et al. | 428/492 |
| 5,484,321 A | 1/1996 | Ishimoto | 446/433 |
| 5,513,683 A | 5/1996 | Causa et al. | 152/209 |
| 5,679,744 A | 10/1997 | Kawauzra et al. | 525/98 |
| 5,773,504 A | 6/1998 | Smith et al. | 524/492 |
| 5,798,405 A | 8/1998 | Zimmer et al. | 524/496 |
| 5,894,900 A | 4/1999 | Yamamoto et al. | 180/9.36 |
| 5,896,904 A | 4/1999 | Ozaki et al. | 152/209 |
| 5,898,047 A | 4/1999 | Howald et al. | 152/209 |
| 5,984,438 A | 11/1999 | Tsunoda et al. | 305/169 |
| 6,056,656 A | 5/2000 | Kitano et al. | 474/268 |
| 6,153,686 A | 11/2000 | Granatowicz et al. | 524/511 |
| 6,193,335 B1 | 2/2001 | Edwards | 305/167 |
| 6,251,992 B1 | 6/2001 | Sandstrom | 525/79 |
| 6,296,329 B1 * | 10/2001 | Rodgers et al. | 305/165 |

FOREIGN PATENT DOCUMENTS

| | | | |
|---|---|---|---|
| EP | 0326394 | 8/1989 | C08L/15/00 |
| EP | 0900826 | 3/1999 | C08L/21/00 |
| EP | 0989161 | 3/2000 | C08L/9/00 |
| EP | 1052165 | 11/2000 | B62D/55/24 |
| EP | 1120335 | 8/2001 | B62D/55/24 |
| JP | 11199710 | 7/1999 | C08L/9/00 |
| WO | 9916600 | 4/1999 | B29B/15/04 |

* cited by examiner

*Primary Examiner*—Alexander S. Thomas
(74) *Attorney, Agent, or Firm*—Henry C. Young, Jr.

(57) ABSTRACT

The invention relates to an endless vehicular rubber track designed for extreme cold temperature working environment. The invention particularly relates to such track having a combination of tread, supporting carcass and guide lug components of rubber compositions intended for such purpose.

11 Claims, 1 Drawing Sheet

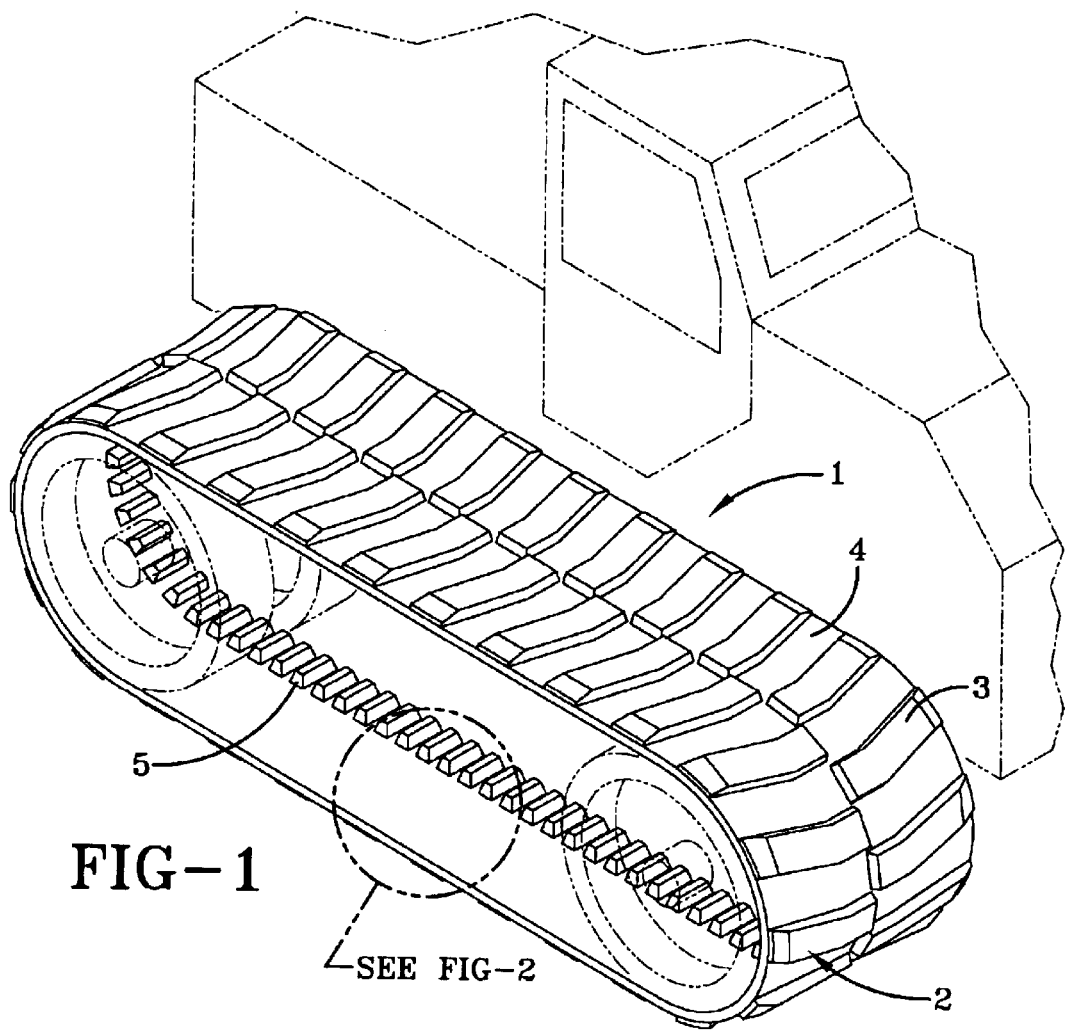
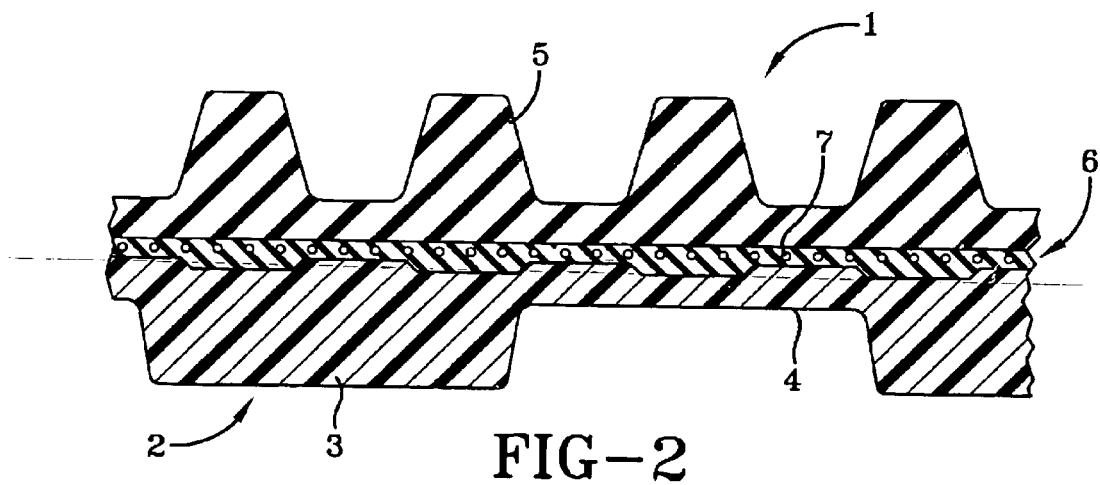

COLD ENVIRONMENT ENDLESS RUBBER TRACK AND VEHICLE CONTAINING SUCH TRACK

The Applicants hereby incorporate by reference prior U.S. Provisional Application Ser. No. 60/323,030, filed on Sep. 12, 2001.

FIELD OF THE INVENTION

The invention relates to an endless vehicular rubber track designed for extreme cold temperature working environment. The invention particularly relates to such track having a combination of tread, supporting carcass and guide lug components of rubber compositions intended for such purpose.

BACKGROUND OF THE INVENTION

Endless rubber tractor tracks are increasingly being used for propelling various vehicles over the ground such as, for example, various tractors and other agricultural vehicles including, for example, combines and spreaders, as well as various earth moving machines.

Such tracks are conventionally designed for operation over a wide temperature range such as, for example, from −20° F. to 70° F., (−28° C. to 21° C.).

However, sometimes it is desired for such tracks to be used under rather extreme cold (e.g. arctic) conditions of temperatures lower than −50° F., (−45° C.), yet over a wide atmospheric service range of about −55° F. to about 90° F., (−48° C. to about 32° C.).

Accordingly, it is desired to provide a vehicular track with components comprised of alternate rubber compositions.

Endless rubber tracks, in general, are conventionally positioned over at least two wheels, normally a drive wheel for engaging an inner surface of the track, often guide lugs as a part of the carcass of the track and driving the track and at least one driven wheel to control the path of the track as it moves to propel the associated vehicle. The outer surface of the peripheral tread component of the track typically contains a plurality of spaced apart raised lugs designed for engaging the ground and assisting the propelling of the associated vehicle such as, for example, a tractor over the ground.

Such tread, in turn, is integral with and supported by a rubber carcass which, for said track, is intended to travel around said drive and driven wheels of an associated vehicle. Rubber guide lugs (which may also serve as drive lugs) are integral with and of a unitary rubber composition with the inner surface of such track carcass.

In practice, the tread of such rubber tracks provide a considerably wider footprint than conventional pneumatic tires and are, thereby, more adaptable to travel over various irregular surfaces such as, in that they offer better flotation over many and varied ground conditions than rubber tires. In addition, use of rubber tracks instead of pneumatic tires may be more useful for traveling over complex ground conditions under relatively extreme cold temperature conditions as compared to vehicles equipped with conventional pneumatic rubber tires.

Historically, the vehicular rubber track carcass component contains continuous steel cables molded into the rubber composition itself to add dimensional stability for the track.

As the rubber track is driven around the aforesaid wheels, it is subject to extensive contortional flexing and, thus, may be subject to tread crack initiation and propagation over time which may be of significant concern when operating the vehicle under very cold conditions.

Accordingly, it is desired that the rubber composition for the tread component and associated carcass and guide lug components of the track have appropriate resistance to flex fatigue, resistance to abrasion and durability under low temperature conditions.

For this description, the term "phr" relates to parts by weight of a material or ingredient per 100 parts by weight rubber.

For this description, the terms "elastomer" and "rubber" may be used interchangeably unless otherwise indicated, and the terms "cure" and "vulcanize" may be used interchangeably unless otherwise indicated.

For this description, a glass transition temperature, or Tg, of a material, particularly an elastomer, may be determined by DSC technique, for which ASTM D3418 may be referred to.

SUMMARY AND PRACTICE OF THE INVENTION

In accordance with this invention, an endless rubber track designed to encompass at least one drive wheel and at least one driven wheel wherein said track is comprised of:

(A) an outer rubber tread component comprised of a plurality of spaced apart, raised lugs designed to be ground-contacting, (B) a unitary
  (1) rubber carcass component integral with, underlying and supporting said tread component, and
  (2) a guide lug component comprised of a plurality of spaced apart rubber guide lugs positioned on and integral with the outer exposed surface of said carcass component, wherein said guide lugs are and designed to be engaged and/or guided by one or more of said drive and driven wheels, wherein
    (a) said tread component is of a rubber composition comprised of, exclusive of elastomers having a Tg higher than −50° C. which comprises, based upon 100 parts by weight elastomers (phr),
      (1) about 15 to about 40 phr of cis 1,4-polybutadiene elastomer having a Tg within a range of about −90° C. to about −115° C., and
      (2) about 85 to about 60 phr of cis 1,4-polyisoprene rubber having a Tg within a range of about −70° C. to about 80° C.,
      (3) about 38 to about 80 phr of reinforcing filler comprised of about 35 to about 65 phr of rubber reinforcing carbon black and about 3 to about 15 phr of aggregates of precipitated silica, and exclusive of a coupling agent having a moiety reactive with silanol groups on the surface of said silica and another moiety interactive with said elastomer(s),
      (4) sulfur curative in a range of about 0.75 to about 1.75 phr and a sulfenamide sulfur cure accelerator,
      (5) zero to about 10 phr, and preferably exclusive of, rubber processing oil selected from at least one of aromatic, naphthenic and paraffinic rubber processing oil and their mixtures, and wherein
    (b) said unitary carcass and said guide lug components are of a unitary rubber composition, exclusive of elastomers having a Tg higher than −50° C., comprised of, based on parts by weight per 100 parts by weight rubber (phr):

(1) about 80 to about 100 phr, alternately about 85 to about 90 phr, of cis 1,4-polyisoprene natural rubber having a Tg within a range of about −70° C. to about −80° C., and (2) zero to about 20 phr, alternately about 15 to about 10 phr of synthetic cis 1,4-polyisoprene rubber having a Tg within a range of about −70° C. to about −80° C., (3) about 38 to about 75 phr of reinforcing filler comprised of about 35 to about 60 phr of rubber reinforcing carbon black and about 3 to about 15 phr of aggregates of precipitated silica, and a coupling agent having a moiety reactive with silanol groups on the surface of said silica and another moiety interactive with said elastomer(s), (4) sulfur curative in a range of about 0.75 to about 1.75 phr and a sulfenamide sulfur cure accelerator (5) zero to about 10 phr, and preferably exclusive of, rubber processing oil selected from at least one of aromatic, naphthenic and paraffinic rubber processing oil and their mixtures, (6) about 5 to about 10 phr of rubber plasticizer, other than an oil, and preferably a monomeric, synthetic rubber processor, having a freeze (melt) point (ASTM D1519) of lower than −45° C.

A significance of limiting the tread rubber composition of the tread component of said track to the cis 1,4-polybutadiene rubber and cis 1,4-polyisoprene rubber (natural rubber) to the exclusion of other elastomers having a Tg of higher than −50° C.

A significance of limiting the unitary carcass component and guide lug component rubber composition the natural cis 1,4-polyisoprene rubber and, optionally said synthetic cis 1,4-polyisoprene rubber to the exclusion of other elastomers having a Tg of higher than −50° C. is to promote very low temperature flexibility for the rubber composition.

It is to be appreciated that styrene/butadiene copolymer rubbers (SBR) may often typically have a Tg above −50° C., depending somewhat upon whether the SBR is derived from an organic solvent-based polymerization of the styrene and 1,3-butadiene monomers (S-SBR) or an aqueous emulsion polymerization thereof (E-SBR). It is also appreciated that such copolymers may have a Tg lower than −50° C. if such copolymer has very low styrene content. Therefore, a minor amount (e.g. not more than about 15 phr) of such copolymer having a Tg below −50° C. might be included in either said track tread rubber composition or in said track unitary carcass and guide lug rubber composition, although, in general, is preferred that said track tread rubber composition and said track carcass/guide lug rubber compositions are exclusive of a styrene/butadiene copolymer rubber.

Preferably the carbon black for said tread, carcass and guide lug components is characterized by having an Iodine Number in a range of about 115 to about 130 g/kg, a DBP value in a range of about 105 to about 125 cm³/100 g, and a Tint value in a range of about 120 to about 140 in order to promote acceptable abrasion resistance for the rubber composition.

One or more low freeze (melt) point rubber plasticizers are used for said unitary carcass and guide lug component rubber composition in order to promote a very low temperature durability for the tread carcass rubber composition.

Representative of such synthetic, non-oil, monomeric, rubber plasticizers, for example, are low freeze (melt) point rubber plasticizers (compatible with diene-based elastomers) having a freeze (melt) point of lower than −45° C. Many plasticizers for rubber compositions are known to those having skill in such art who would also be aware that some of such plasticizers have such low freeze (melt) points.

Representative examples of such plasticizers intended for use in various rubber compositions having a freeze (melt) point within a range of −45° C. to about −65° C. or lower, although not intended herein to be limiting are, for example, one or more of adipates, azelates, gluterates, sebacates, oleates, hexoates, tallates and trimellitates.

Representative examples of such adipates are, for example, alkyl alkyldiester adipate as Plasthall® 7006, diioctyl adipate as Plasthall DIOA, dioctyl adipate as Plasthall DOA, polyester adipate as Plasthall P-634, diisooctyl adipate as Monoplex DDA and dioctyl adipate as Monoplex DOA, all from the CP Hall Company.

Representative examples of such azelates is, for example, dioctyl azelate as Plastall DOZ from the CP Hall Company.

Representative of such gluterates are, for example, dialkyl diether gluterate as Plasthall 7050, dibutoxyethoxyethyl gluteratate as Plasthall 224, dibutoxyethyl glutarate, and diisodecyl glutarate as Plasthall 201, all from the CP Hall Company.

Representative of such oleates are, for example, alkyl oleate as Plasthall 7049 and butyl oleate as Plasthall 503, all from the CP Hall Company.

Representative of such sebacates are, for example, dioctyl sebacate as Plasthall DOS, all from the CP Hall Company.

Representative of a tallate is, for example, isooctyl tallate as Plasthall 100 from the CP Hall Company.

Representative of trimellitates are, for example, triisooctyl trimellitate as Plasthall TIOTM, trioctyl trimellitate as Plasthall TOTM and linear trimellitate as: Plasthall LTM, all from the CP Hall Company.

Representative of hexoates are, for example, polyethylene glycol 400 di-2-ethylhexoate as TegMer® 809, tetraethylene glycol di-2-ethylhexoate as TegMeR® 804, and tetraethylene glycol di-2-ethyhlhexoate as TegMer® 804 special, all from the CP Hall Company.

Representative of another rubber plasticizer is diisooctyl dodecanedioate as Plasthall DIODD from the CP Hall Company.

In further accordance with this invention, a vehicle is provided having at least two endless rubber track systems, namely a track system on each side of the vehicle, for driving said vehicle over the ground, said track systems individually comprised of the track of this invention, a plurality of wheels engaged with said vehicle and encompassed by said track wherein at least one of said wheels is a drive wheel.

The flex fatigue limitation of the cured track's tread rubber composition is considered herein to be important or significant to the durability and service life of the track tread.

The abrasion resistance of the cured track's tread rubber composition is considered herein to be important or significant to wear performance of the track tread (e.g.: resistance to wear due to abrasion).

The prescribed combination of elastomers, carbon black, silica and antioxidant content of the cured track's tread rubber composition is considered herein to be important or significant to aid in achieving the track tread's performance (e.g.: resistance to flex fatigue and resistance to wear).

Significant aspects of this invention include:

(A) use of a combination of natural rubber and cis 1,4-polybutadiene rubber for the track tread designed to promote treadwear and flex fatigue resistance, (B) relatively low level (content) of sulfur curative designed to promote less crosslinking and higher chain extension of the tread rubber composition, (C) exclusion of a coupling agent for the silica for the track tread designed to increase the cured elastomer composition's resistance to flex fatigue and maintain resistance to tear propagation as compared to such composition using a silica coupling agent, (D) specified carbon black as a tire tread grade of carbon black for the track tread in order to promote suitable tear strength and resistance or tread service related damage (E) relatively low level of rubber processing oil, if any.

Indeed, while the individual ingredients are known, it is considered that the above combination of ingredients for the tread component of the endless track for this invention is novel and inventive.

Significant aspects for the unitary rubber carcass component and said guide lug component rubber compositions are:

(A) use of cis 1,4-polyisoprene natural rubber and, optionally synthetic cis 1,4-polyisoprene rubber designed to promote flex fatigue resistance, (B) relatively low level (content) of sulfur curative designed to promote less crosslinking and higher chain extension of the tread rubber composition, (C) inclusion of a of a coupling agent for the aggregates of silica designed to enhance tear strength of the rubber composition and adhesion to other rubber components of the track.

(D) specified carbon black as a tire grade of carbon black intended to promote an acceptable tear strength and resistance to abrasion for the rubber composition.

(E) relatively low level of rubber processing oil, if any.

(F) use of a low freeze (melt) point plasticizer, other than oil and preferably a monomeric, synthetic rubber plasticizer, in order to promote very low temperature durability and resistance to flex fatigue for the rubber composition.

The track, including its tread component, is then sulfur cured (vulcanized) in a suitable mold at an elevated temperature (e.g.: about 150° C. to about 170° C.).

Accordingly, the invention also contemplates a sulfur-vulcanized endless track. Further, the invention contemplates a vehicle having at least two endless rubber track systems (each on an opposite side of the vehicle) for driving said vehicle over the ground, said track systems individually comprised of said track, a plurality of wheels engaged with said vehicle and encompassed by said track wherein at least one of said wheels is a drive wheel.

For a further understanding of this invention, the accompanying drawings are referred to in FIG. 1 which depicts a perspective view of an endless rubber track, FIG. 2 depicts a longitudinal cross-section of such track.

In the drawings, a rubber track (1) is provided having a rubber tread component (2) of which contains spaced apart raised lugs (3) from the tread surface (4). The tread (2) is of a rubber composition composed of cis 1,4-polyisoprene natural rubber and cis 1,4-polybutadiene rubber which contains a combination of carbon black and precipitated silica reinforcement without a coupling agent.

Guide lugs (5) positioned on and as a unitary rubber composition of the inner surface of the carcass (6) of the track (1) are also shown which can be engaged by an appropriate drive wheel of the vehicle to drive the track (1). Alternatively, the track (1) can be driven by a friction wheel.

The track (1) itself is composed of the circumferential tread (2) component integral with and on a carcass (6). The carcass component contains a fabric (e.g. steel or glass fiber reinforced plastic) belt reinforcement (7) for dimensional stability.

The carcass (6) component and guide lug component (5) is of a rubber composition which comprises natural rubber, synthetic cis 1,4-polyisoprene rubber, carbon black, silica, coupling agent for said silica and low freezing point plasticizer.

It is to be appreciated that use of the track tread in very cold temperature environment over ground surfaces which can be rough in nature presents problems not normally experienced by a toroidially-shaped pneumatic tire. In one aspect, the track has a relatively thin cross-section not supported by pneumatic air pressure as would be experienced by a pneumatic tire. Further, the track inherently presents a large footprint on the ground whereas a toroidal pneumatic tire presents a relatively small footprint.

Indeed, the track tread presents special problems and challenges as it propels a vehicle over what is usually a relatively harsh environment.

Accordingly, it is desirable to provide a track with a tread which it presents abrasion resistance to wear occurring from the ground and, also, flex fatigue as it contorts around the various drive and driven wheels of the associated vehicle.

In particular, and for the purposes of this invention, the track tread rubber composition is composed of specified elastomers, carbon black, silica in the absence of coupling agent, as well as controlled selection and amounts of antidegradant, processing oil and sulfur-cure accelerators.

Further, for the purposes of this invention, the carcass and guide lug components of this invention are of a rubber composition which contains specified elastomers, carbon black, silica together with a coupling agent for the silica and a low freezing point plasticizer.

It is to be appreciated that the individual materials recited above, for the most part, have been utilized for various rubber compositions for various tire components. However, it is considered herein that it is a significant aspect of this invention that the specified components for the rubber composition for the track tread are novel and inventive in that specified ingredients are chosen and utilized in a unique combination thereof by the specified combination thereof as well as specified amounts for a track rubber components.

In particular, the carbon black for the track tread component is preferably a tire tread grade of carbon black with an Iodine Number (ASTM D1510) in a range of about 115 to about 130 g/kg, a dibutyl phthalate (DBP) value (ASTM) D2414) in a range of about 105 to about 125 cm$^3$/100 g and a Tint value (ASTM D3265) in a range of about 120 to about 140.

Representative examples of such carbon blacks are, for example, those of ASTM designations N220 and N234.

In particular, the Iodine Number limitation for the carbon black is considered herein to be important, or significant, to enhance abrasion resistance and hysteretic qualities of the track tread rubber composition.

The DBP value limitation for the carbon black is considered herein to be important or significant to enhance resistance to flex fatigue of the track tread rubber composition.

The Tint value limitation is considered herein to be important or significant to enhance abrasion resistance for the track tread rubber composition.

In the practice of this invention, a relatively high level, or content, of antidegradant is desirably used for the tread component, namely, in a range of about 4.5 to about 10 phr in order to enhance resistance to flex fatigue over time for the track tread rubber composition.

Such antidegradants should be a combination of antiozonant and antioxidant for rubber compositions as conventionally used for cured rubber compositions intended to be exposed to atmospheric conditions in dynamic applications.

Representative examples of such antidegradants are, for example, polymerized 2,2,4-trimethyl 1,2-dihydroquinoline which might be obtained as Flectol'r' TMQ from the Flexsys America L.A. Company, N-1,3-dimethylbutyl-N'-phenyl para-phenylenediamine which might be obtained as Wingstay® 300, a trademark of The Goodyear Tire & Rubber Company, and mixed aryl-p-phenylenediamines such as Wingstay® 100, a trademark of The Goodyear Tire & Rubber Company. Such antidegradants are well known to those having skill in such art.

Use of aromatic hydrocarbon rubber processing oils in a range of zero to about 10, preferably about one to about 10, phr is desired for the practice of this invention in order to enhance processability of the unvulcanized rubber composition for the track tread component as well as to enhance a balance of a combination of tensile strength and elongation of a sulfur-vulcanized track tread rubber composition. Such aromatic rubber processing oil as well as mixtures of alkylated napthenic and aromatic hydrocarbon rubber processing oils, and their use as processing aids, are well known to those having skill in the preparation of rubber compositions.

It is desired, for the practice of this invention, that a semi-EV vulcanization system be used for the tread component which is comprised of a relatively limited sulfur content in a range of about 0.75 to 1.75 phr in combination with a primary sulfenamide-based accelerator preferably selected from at least one cyclohexylbenzothiazole sulfenamide, tert-butyl-2-benzothiazole sulfenamide and N-dicyclohexyl-2-benzothiazole sulfenamide, all of which are well known primary sulfur-vulcanization accelerators.

By the term "semi-EV vulcanization system", as used in the description of this invention, it is meant that approximately equal amounts (phr) of primary accelerator(s) and added free sulfur are used.

It is to be appreciated that secondary accelerator(s) as well as vulcanization retarder(s) may also be used where appropriate to control the vulcanization reaction.

In the practice of this invention, silica, particularly precipitated silica, is used primarily to assist in enhancing tear resistance of the track tread's rubber composition.

Various silicas may be used, preferably precipitated silicas. Precipitated silicas for use in rubber compositions, including for tire treads, are well known to those skilled in such art. Representative of such silicas are, for example, HiSil 210 and HiSil from PPG Industries.

In the practice of this invention, a silica coupler is not used for the silica of the tread component but is used for the carcass and guide lug components.

Representative of such coupling agent is, for example, a bis(3-trialkoxysilylalkyl) polysulfide having an average of from 2 to 2.6 or of from 3.5 to 4 connecting sulfur atoms in its polysulfidic bridge. Such coupling may be, for example, a bis(3-triethoxysilylpropyl) polysulfide.

It is readily understood by those having skill in the art that the rubber compositions for the track components may be compounded by methods generally known in the rubber compounding art, such as, unless otherwise specified herein, mixing the sulfur-vulcanizable constituent diene-based elastomers with various commonly-used additive materials such as, for example, curing aids, such as sulfur, activators, retarders and accelerators, processing additives, such as the aforesaid aromatic rubber processing oils, resins including tackifying resins if used, plasticizers such as said low freeze (melt) point plasticizer where appropriate, fatty acid including stearic acid, zinc oxide, waxes, antioxidants and antiozonants as discussed herein, peptizing agents if used, and reinforcing fillers such as carbon black and precipitated silica as discussed herein. As known to those skilled in the art, depending on the intended use of the sulfur vulcanizable and sulfur-vulcanized compounds or tread compounds, the additives mentioned above are selected and commonly used in conventional amounts unless otherwise specified for the track tread of this invention.

Typical amounts of tackifier resins, if used, may be, for example, about 1 to about 5 phr, usually about 1 to about 5 phr. Typical amounts of processing aids, if used, may be about 1 to about 10 phr. Such processing aids can include, for example, the aforesaid aromatic rubber processing oil which includes a combination, of mixture, of aromatic and naphthenic rubber processing oil. Typical amounts of fatty acids, if used, which can include stearic acid may be, for example, about 0.5 to about 4 phr. Typical amounts of zinc oxide may be, for example, about 2 to about 5 phr. Typical amounts of waxes if used, such as microcrystalline waxes may be, for example, about 1 to about 5 phr. Typical amounts of peptizers, if used, may be, for example, about 0.1 to about 1 phr. Typical peptizers may be, for example and if used, pentachlorothiophenol and dibenzamidodiphenyl disulfide.

The vulcanization is conducted in the presence of a sulfur-vulcanizing agent, accelerator (e.g. said sulfenamide accelerator) and, optionally, a secondary accelerator and/or retarder in the practice of this invention in which, as hereinbefore related, a semi-EV vulcanization system is prescribed.

If a secondary accelerator is used, the secondary accelerator might be, for example, a guanidine, dithiocarbamate or thiuram compound.

A portion of the selection and amounts of the various compounding ingredients are important as hereinbefore described. Otherwise the selection and amounts may be adjusted or modified by the practitioner as deemed suitable for the desired track tread properties.

The track can be built, shaped, molded and cured by various methods which are known or apparent to those having skill in such art.

The rubber compositions, or compound, for the track components may be prepared, for example, by mixing the ingredients in several sequential non-productive stages (without the sulfur and associated accelerator(s) curatives together with antidegradant(s) to temperatures of about 165° C. followed by a final productive mixing stage to a temperature of about 105° C. in which the curatives and antidegradants are added. An internal rubber mixer (Banbury type) may be used.

The resulting uncured rubber compounds may then be processed to form, for example, one or more sections of the track which, in turn, may be inserted into a suitable mold and cured at a temperature of, for example, about 150° C. to form a continuous track.

EXAMPLE I

Track Tread

Rubber compositions for a track tread are prepared and referred to as Samples A, B and C. Rubber Sample A is used as a Control rubber sample.

Control Sample A is based upon an elastomer composition comprised of cis 1,4-polyisoprene natural rubber and styrene/butadiene copolymer rubber together with carbon black, silica and coupling agent.

Sample B is based upon an elastomer composition comprised of low Tg natural cis 1,4-polyisoprene and cis 1,4-polybutadiene elastomers together with carbon black, silica and no coupling agent.

Sample C is based upon an elastomer composition comprised of natural rubber and cis 1,4-polybutadiene rubber with an increased amount of carbon black and a reduced amount of carbon black as compared to Sample B.

Both Samples B and C contained a substantially increased amount of antidegradant in order to promote long term flex fatigue resistance for the rubber composition.

The compositions for the rubber Samples are shown in the following Table 1.

For the rubber compositions, the ingredients are first mixed in at least one non-productive mixing stage for about five minutes to a temperature of about 165° C. The non-productive mix stages refer to the mixing of the ingredients without the curatives such as sulfur and vulcanization accelerators. The term "non-productive" mixing is well known to those having skill in such art. Then the sulfur curative, together with accelerator(s), is mixed in a final mixing stage for about 2 minutes to a temperature of about 105° C.

TABLE 1

Track Tread Compositions

|  | Control Sample A | Sample B | Sample C |
|---|---|---|---|
| Non-productive Mixing Stage |  |  |  |
| Natural rubber[1] | 80 | 80 | 65 |
| SBR[2] | 20 | 0 | 0 |
| Polybutadiene rubber[3] | 0 | 20 | 35 |
| Carbon black A[4] | 48 | 0 | 0 |
| Carbon black B[5] | 0 | 48 | 65 |
| Silica[6] | 7 | 7 | 5 |
| Coupling agent[7] | 2 | 0 | 0 |
| Zinc oxide | 4 | 3.5 | 3.5 |
| Fatty acid | 3 | 2 | 3 |
| Antidegradants[8] | 2.8 | 8 | 8 |
| Productive Mixing Stage |  |  |  |
| Sulfur[9] | 1.5 | 0.95 | 0.95 |
| Accelerators[10] | 1.4 | 1.5 | 1.5 |

[1]Natural cis 1,4-polyisoprene rubber
[2]Styrene/butadiene copolymer rubber as PLF1502 from The Goodyear Tire & Rubber Company having a styrene content of about 23 percent and prepared by emulsion polymerization
[3]Cis 1,4-polybutadiene rubber as BUDENE ® 1207 from The Goodyear Tire & Rubber Company having a cis 1,4-content of greater than 90 percent
[4]N220 carbon black having an Iodine No. of about 121, a DBP value of about 114, a Nitrogen absorption value of about 119 and a Tint value of about 116
[5]Carbon black having an Iodine number of about 122, a DBP value of about 114, a nitrogen absorption area value of about 130, and tint value of about 131
[6]Precipitated silica as HiSil 210 from PPG Industries
[7]Coupling agent as X50S from Degussa AG, a blend of bis(3-triethoxysilylpropyl) tetrasulfide and carbon black carrier combination in a 50/50 ratio.
[8]Antioxidant as polymerized 2,2,4-trimethyl 1,2 dihydroquinoline obtained as Flectol TMQ from the Flexsys America L.P. Company, amine-based antiozonant as N-1,3-dimethylbutyl-N'-phenylene diamine, from The Goodyear Tire & Rubber Company and amine-based antioxidant/antiozonant as mixed aryl-p-phenylene diamines, as Wingstay ® 100, a trademark of The Goodyear Tire & Rubber Company
[9]Rubber maker's sulfur
[10]N-t-butyl-2-benzothiazole sulfenamide primary accelerator and N-(cyclohexylthio) phthalimide retarder.

The rubber compositions were cured for about 100 minutes at a temperature of about 150° C. This cure condition, namely 100 minutes at 150° C., is intended to simulate the production track cure process conditions Various physical properties of the rubber compositions were measured and reported in the following Table 2.

TABLE 2

Track Tread Samples

| Property | Control Sample A | Sample B | Sample C |
|---|---|---|---|
| 300% modulus (MPa)[1] | 9.6 | 5.4 | 6.3 |
| Tensile (MPa)[1] | 20 | 17 | 17 |
| Elongation (%)[1] | 547 | 654 | 637 |
| Rebound (100° C.)[2] | 50 | 46 | 42 |
| Rebound (23° C.)[2] | 35.3 | 35.8 | 33.7 |
| Hardness, Shore A[4] | 65 | 56 | 62 |
| Fatigue flex test (kilocycles to failure)[5] | 18.2 | 25.6 | 22.4 |
| Crack initiation test at 135° C. (hours to crack)[7] | 142 | 223 | 194 |
| Peel adhesion (N/mm)[8] | 32 | 53 | 50 |
| Brittle Point[9] | −56° C. | est −80 to −90° C. | −94° C. |

[1]Tensile strength, elongation at break and 300% modulus were measured according to ASTM Test D412 (ring sample option) and are considered herein as a measure of the strength of the respective rubber compositions. Higher values are usually indicative of greater durability. For example, a tensile strength greater than 18 MPa is desired for the tread rubber composition of the track of this invention.
[2]The Rebound test (ASTM D1054) provides a measure of hysteretic properties of the rubber compositions. A higher value is indicative of a less hysteretic running rubber composition which is preferred. A track with tread rubber composition with higher rebound value would be expected to exhibit a lower operating temperature when used in service.
[4]The Shore A hardness test (ASTM D2240) is indicative of greater resistance to field crop stubble penetration and a higher value is preferred.
[5]Kilocycles to fatigue flex failure (ASTM D4482) is indicative of resistance to track tread fatigue cracking and a higher value is preferred. Testing in this instance used a strain of 95 percent.
[7]Time to crack initiation (ASTM D454) which is indicative of tread durability for the track and a higher value is preferred
[8]Peel adhesion comparison is a measure of tear strength values for Samples A, B and C. Tear strength improvement for Sample C is in the order of 56 percent as compared to Sample A and is considered to be predictive of the tread material's resistance to damage in field service. Therefore, a higher value is preferred. A description of the peel adhesion test may be found in U.S Pat. No. 5,310,921.
[9]ASTM D2137

The following physical properties of the Samples B and C are significantly better, or substantially equivalent, those of Control Sample A.

(A) substantially improved low temperature brittle point;

(B) somewhat improved number of kilocycles to Fatigue failure;

(C) similar Rebound properties; and (D) similar hardness values.

The improvements in the above brittle point is considered herein to be significant for use at very lot temperatures. It is considered herein that comparative physical properties for Samples B and C, and particularly Sample C, are achieved via a combination of (A) replacement of the styrene/butadiene rubber with cis 1,4-polybutadiene rubber and using an increased amount for Sample B; and (B) use of a carbon black with higher colloidal properties as indicated by higher tint value 131 and higher nitrogen adsorption value of 130.

It is important to appreciate that varying selection and amounts of ingredients in a rubber composition involves many trade-offs insofar as resultant rubber composition properties is concerned, particularly since it is often not reasonably possible to achieve all of desired physical properties for a tread rubber composition.

For endless track treads of this invention, a primary objective is to maximize flex life and minimize both track wear and crack formation.

EXAMPLE II

Track Carcass AND Guide Lugs

Rubber compositions were prepared and referred to as Samples X and Y. Rubber Sample X was prepared and used as a Control sample.

Control Sample X is based upon an elastomer composition comprised of cis 1,4-polyisoprene natural rubber and styrene/butadiene rubber together with carbon black, silica and coupling agent.

Sample Y is based upon a rubber composition comprised of cis 1,4-polyisoprene natural rubber and synthetic cis 1,4-polyisoprene rubber together with carbon black, silica and coupling agent and a low freezing point plasticizer.

The compositions for the rubber Samples X and Y are shown in the following Table 3.

For the rubber compositions, the ingredients are first mixed in at least one non-productive mixing stage for about five minutes to a temperature of about 165° C. The non-productive mix stages refer to the mixing of the ingredients without the curatives such as sulfur and vulcanization accelerators. The term "non-productive" mixing is well known to those having skill in such art. Then the sulfur curative, together with accelerator(s), is mixed in a final mixing stage for about 2 minutes to a temperature of about 105° C.

TABLE 3

Track Carcass and Guide Lug Composition

|  | Control Sample X | Sample Y |
|---|---|---|
| Non-productive Mixing Stage | | |
| Cis 1,4-polyisoprene Natural rubber[1] | 80 | 80 |
| SBR[2] | 20 | 0 |
| Cis 1,4-polyisoprene synthetic rubber[3] | 0 | 20 |
| Plasticizer[4] | 0 | 7 |
| Carbon black A[5] | 48 | 48 |
| Silica[6] | 7 | 7 |
| Coupling agent[7] | 0 | 2 |
| Zinc oxide | 4 | 4 |
| Fatty acid | 3 | 2 |
| Antidegradants[8] | 2.8 | 2.8 |

TABLE 3-continued

Track Carcass and Guide Lug Composition

|  | Control Sample X | Sample Y |
|---|---|---|
| Productive Mixing Stage | | |
| Sulfur[9] | 1.5 | 1.5 |
| Accelerators[10] | 1.4 | 1.4 |

[1]Natural cis 1,4-polyisoprene rubber having a Tg of about −75° C.
[2]Styrene/butadiene copolymer rubber as PLF1502 from The Goodyear Tire & Rubber Company having a styrene content of about 23 percent and prepared by emulsion polymerization having a Tg of about −45° C. to about −55° C.
[3]Cis 1,4-polyisoprene rubber as Natsyn'r' 2200 from The Goodyear Tire & Rubber Company having a cis 1,4-content of greater than 90 percent and a Tg of about −70° C.
[4]Dioctyl sebacate as Plasthall DOS from the CP Hall Company having a freeze (melt) point of about −65° C.
[5]N220 carbon black, an ASTM designation
[6]Precipitated silica as HiSil 210 from PPG Industries.
[7]Coupling agent as X50S from Degussa AG, a blend of bis(3-triethoxysilylpropyl) tetrasulfide and carbon black carrier composite in a 50/50 ratio.
[8]Antioxidant as polymerized 2,2,4-trimethyl 1,2 dihydroquinoline obtained as Flectol TMQ from the Flexsys America L.P. Company, amine-based antiozonant as N-1,3-dimethylbutyl-N'-phenylene diamine, from The Goodyear Tire & Rubber Company and amine-based antioxidant/antiozonant as mixed aryl-p-phenylene diamines, as Wingstay® 100, a trademark of The Goodyear Tire & Rubber Company.
[9]Rubber Maker's sulfur
[10]N-t-butyl-2-benzothiazole sulfenamide primary accelerator and N-(cyclohexylthio) phthalimide retarder The rubber compositions were cured for about 100 minutes at a temperature of about 150° C. Various physical properties of the rubber compositions were measured and reported in the following Table 4.

TABLE 4

Track Carcass and Guide Lug Samples

| Property | Control Sample X | Sample Y |
|---|---|---|
| 300% modulus (MPa) | 11.5 | 12.5 |
| Tensile (MPa) | 22.1 | 21.6 |
| Elongation (%) | 505 | 467 |
| Rebound (100° C.) | 40.3 | 49.6 |
| Brittle point[1] | −56.2 | −67 |
| Hardness, Shore A | 69.8 | 64.3 |
| DIN abrasion at 10 Newtons (mm³ loss) | 151 | 129 |
| Fatigue flex test (kilocycles to failure) at 95% strain | 49.2 | 48.3 |
| Micron eye (kilocycles to failure)[2] | 245.6 | 328.3 |
| Peel adhesion (Newtons) | 110.8 | 92.1 |

[1]ASTM D2137 procedure
[2]ASTM D813 procedure modified by piercing the rubber specimen at the edge rather than at the center From Table 4 it is seen that the brittle point of Sample Y is substantially lower than the brittle point of Control Sample X and also that the number of kilocycles to failure by the Micron eye test greatly increased.

This is considered herein to be significant because it is considered herein that the substantially lower brittle point for Sample Y renders it more suitable for extremely low temperature operation and the extended fatigue to failure cycles for the Micron eye test indicates a significant increase in durability for the rubber composition of Sample Y. This is also significant because it is considered herein such lowering of the brittle point would otherwise normally be expected to decrease such resistance to fatigue as measured by the Micron eye test.

EXAMPLE III

A track was prepared having a tread of the rubber composition of Sample C of Example I and a unitary rubber carcass and guide lugs of Sample Y of Example II. The track with assembled tread and carcass/guide lug rubber components was cured in a suitable mold at a temperature of about 100° C.

Several of such tracks were mounted on a tractor-type vehicles which contained at least one drive wheel and at least one driven wheel.

After an average of from about 700 to about 1000 vehicular operational hours for several of such tracks at very cold conditions reaching, perhaps, a low temperature of about –50° C., according to a visual inspection there were no indications of adverse physical effects or damage for the tracks due to the extremely low temperature.

While certain representative embodiments and details have been shown for the purpose of illustrating the invention, it will be apparent to those skilled in this art that various changes and modifications may be made therein without departing from the spirit or scope of the invention.

What is claimed is:

1. An endless rubber track designed to encompass at least one drive wheel and at least one driven wheel wherein said track is comprised of:
    (A) an outer rubber tread component comprised of a plurality of spaced apart, raised lugs designed to be ground-contacting,
    (B) a unitary
        (1) rubber carcass component integral with, underlying and supporting said tread component, and
        (2) a guide lug component comprised of a plurality of spaced apart rubber guide lugs positioned on and integral with the outer exposed surface of said carcass component, wherein said guide lugs are designed to be engaged and/or guided by one or more of said drive and driven wheels, wherein
            (a) said tread component is of a rubber composition exclusive of elastomers having a Tg higher than –50° C., which comprises, based upon 100 parts by weight elastomers (phr),
                (1) about 15 to about 40 phr of cis 1,4-polybutadiene elastomer having a Tg within a range of about –90° C. to about –115° C., and
                (2) about 85 to about 60 phr of cis 1,4-polyisoprene rubber having a Tg within a range of about –70° C. to about –80° C.,
                (3) about 38 to about 80 phr of reinforcing filler comprised of about 35 to about 65 phr of rubber reinforcing carbon black and about 3 to about 15 phr of aggregates of precipitated silica; and exclusive of a coupling agent having a moiety reactive with silanol groups on the surface of said silica and another moiety interactive with said elastomer(s),
                (4) sulfur curative in a range of about 0.75 to about 1.75 phr and a sulfenamide sulfur cure accelerator,
                (5) zero to about 10 phr of rubber processing oil selected from at least one of aromatic, naphthenic and paraffinic rubber processing oil and their mixtures, and wherein
            (b) said unitary carcass and said guide lug components are of a unitary rubber composition, exclusive of elastomers having a Tg higher than –50° C., comprised of, based on parts by weight per 100 parts by weight rubber (phr):
                (1) about 80 to about 100 phr of cis 1,4-polyisoprene natural rubber having a Tg within a range of about –70° C. to about –80° C., and
                (2) zero to about 20 phr of synthetic cis 1,4-polyisoprene rubber having a Tg within a range of about –70° C. to about –80° C.,
                (3) about 38 to about 75 phr of reinforcing filler comprised of about 35 to about 60 phr of rubber reinforcing carbon black and about 3 to about 15 phr of aggregates of precipitated silica, and a coupling agent having a moiety reactive with silanol groups on the surface of said silica and another moiety interactive with said elastomer(s),
                (4) sulfur curative in a range of about 0.75 to about 1.75 phr and a sulfenamide sulfur cure accelerator
                (5) zero to about 10 phr of rubber processing oil selected from at least one of aromatic, naphthenic and paraffinic rubber processing oil and their mixtures,
                (6) about 5 to about 10 phr of rubber plasticizer, other than an oil, wherein said plasticizer is selected from adipates, azelates, gluterates, oleates, hexoates, tallates and trimellitates, and their mixtures having a freeze (melt) point of lower than –45° C.

2. A sulfur-vulcanized track of claim 1.

3. The track of claim 2 wherein said carbon black for said tread component is selected from at least one of N220 and N234.

4. A vehicle having at least two endless rubber track systems, namely a track system on each side of the vehicle, for driving said vehicle over the ground, said track systems individually comprised of the track of claim 3, a plurality of wheels engaged with said vehicle and encompassed by said track wherein at least one of said wheels is a drive wheel.

5. The track of claim 2 wherein said antidegradant is selected from at least one of polymerized 2,2,4-trimethyl 1,2-dihydroquinoline, N-1,3-dimethylbutyl-N'-phenyl paraphenylenediamine and mixed aryl-p-phenylenediamines.

6. A vehicle having at least two endless rubber track systems, namely a track system on each side of the vehicle, for driving said vehicle over the ground, said track systems individually comprised of the track of claim 5, a plurality of wheels engaged with said vehicle and encompassed by said track; wherein at least one of said wheels is a drive wheel.

7. The track of claim 2 wherein said unitary carcass and drive lug rubber composition is exclusive of any of aromatic, naphthenic and paraffinic oil.

8. A vehicle having at least two endless rubber track systems, namely a track system on each side of the vehicle, for driving said vehicle over the ground, said track systems individually comprised of the track of claim 7, plurality of wheels engaged with said vehicle and encompassed by said track; wherein at least one of said wheels is a drive wheel.

9. The track of said claim 2 wherein said plasticizer is selected from at least one of alkyl alkyldiester adipate, diioctyl adipate, dioctyl adipate, polyester adipate, diisooctyl adipate, dioctyl azelate, dialkyl diether gluterate, dibutoxyethoxyethyl gluteratate, dibutoxyethyl glutarate, diisodecyl glutarate, alkyl oleate, butyl oleate, dioctyl sebacate, isooctyl tallate, triisooctyl trimellitate, trioctyl trimellitate, linear trimellitate, polyethylene glycol 400 di-2-ethylhexoate, tetraethylene glycol di-2-ethylhexoate, tetraethylene glycol di-2-ethylhexoate, and diisooctyl dodecanedioate, and their mixtures.

10. A vehicle having at least two opposing endless rubber track systems, namely a track system on each side of the vehicle, for driving said vehicle over the ground, said track systems individually comprised of the track of claim 2, a plurality of wheels engaged with said vehicle and encompassed by said track wherein at least one of said wheels is a drive wheel.

11. The track of claim 2 wherein said carcass and said guide lug components are of a unitary rubber composition, exclusive of elastomers having a Tg higher than −50° C., comprised of elastomers, based on parts by weight per 100 parts by weight rubber (phr), as:
- (A) about 85 to about 90 phr of cis 1,4-polyisoprene natural rubber having a Tg within a range of about −70° C. to about −80° C., and
- (B) about 15 to about 10 phr of synthetic cis 1,4-polyisoprene rubber having a Tg within a range of about −70° C. to about −80° C.

* * * * *